United States Patent
Dang et al.

(10) Patent No.: US 10,476,834 B2
(45) Date of Patent: Nov. 12, 2019

(54) SYSTEM AND METHOD FOR RANDOM ACCESS

(71) Applicant: Huawei Technologies Canada Co., Ltd., Kanata (CA)

(72) Inventors: Jing Dang, Nepean (CA); Halim Yanikomeroglu, Ottawa (CA); Nimal Gamini Senarath, Ottawa (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 624 days.

(21) Appl. No.: 14/644,959

(22) Filed: Mar. 11, 2015

(65) Prior Publication Data

US 2015/0264132 A1 Sep. 17, 2015

Related U.S. Application Data

(60) Provisional application No. 61/951,371, filed on Mar. 11, 2014.

(51) Int. Cl.
*H04W 76/10* (2018.01)
*H04W 74/08* (2009.01)
*H04W 72/04* (2009.01)
*H04L 12/58* (2006.01)

(52) U.S. Cl.
CPC ......... *H04L 51/38* (2013.01); *H04W 72/0486* (2013.01); *H04W 74/0833* (2013.01); *H04W 76/10* (2018.02)

(58) Field of Classification Search
CPC .............. H04L 51/38; H04W 74/0833; H04W 72/0486
See application file for complete search history.

(56) References Cited

U.S. PATENT DOCUMENTS

| | | |
|---|---|---|
| 5,295,140 A | 3/1994 | Crisler et al. |
| 6,735,188 B1 | 5/2004 | Becker et al. |
| 2005/0149649 A1 | 7/2005 | Carneal et al. |

(Continued)

OTHER PUBLICATIONS

"3rd Generation Partnership Project; Technical Specification Group Radio Acess Network; Spatial channel model for Multiple Input Multiple Output (MIMO) simulations (Release 11)," 3GPP TR 25.996 V11.0.0, Technical Report, Sep. 2012, 40 pages.
"3rd Generation Partnership Project; Technical Specification Group Radio Access Network; Evolved Universal Terrestrial Radio Access (E-UTRA); Physical channels and modulation (Release 11)," Technical Specification, 3GPP TS 36.211 V11.4.0, Sep. 2013, 120 pages.

(Continued)

*Primary Examiner* — Abdulkader M Alriyashi
(74) *Attorney, Agent, or Firm* — Slater Matsil, LLP

(57) ABSTRACT

A method for operating a user device adapted to transmit data in a communications system in which available resources are divided into contention resources and non-contention resources includes selecting a first non-contention resource from the non-contention resources in accordance with selection information, the user device configured to transmit data on the first non-contention resource, determining a contention resource from a first plurality of contention resources associated with the first non-contention resource, in accordance with an association between the first plurality of contention resources and the first non-contention resource is known by the user device and a network node in the communications system, and transmitting a message on the contention resource, wherein the message initiates a random access procedure to obtain access to the selected first non-contention resource.

21 Claims, 10 Drawing Sheets

(56) References Cited

U.S. PATENT DOCUMENTS

| | | | |
|---|---|---|---|
| 2009/0227277 A1 | 9/2009 | Gupta et al. | |
| 2009/0247174 A1* | 10/2009 | Zhang | H04L 1/1607 455/450 |
| 2011/0292895 A1 | 12/2011 | Wager et al. | |
| 2011/0310828 A1* | 12/2011 | Lin | H04W 74/08 370/329 |
| 2012/0014269 A1 | 1/2012 | Ray et al. | |
| 2012/0033613 A1* | 2/2012 | Lin | H04W 74/085 370/328 |
| 2012/0195216 A1* | 8/2012 | Wu | H04W 72/0486 370/252 |
| 2012/0230261 A1* | 9/2012 | Pradas | H04W 74/08 370/329 |
| 2014/0036876 A1 | 2/2014 | Li et al. | |

OTHER PUBLICATIONS

Gotsis, A. G., et al., "M2M Scheduling Over LTE ; Challenges and New Perspectives," IEEE Vehicular Technology Magazine, Sep. 2012, pp. 34-39.

Jain, R. K., et al., "A Quantitative Measure of Fairness and Discrimination for Resource Allocation in Shared Computer System," DEC-TR-301, Sep. 26, 1984, 38 pages.

Laya, A., et al., "Is the Random Access Channel of LTE and LTE-A Suitable for M2M Communications? A Survey of Alternatives," IEEE Communications Surveys & Tutorials, vol. 16, No. 1, First Quarter 2014, pp. 4-16.

International Search Report and Written Opinion of Patent Cooperation Treaty (PCT), International Application No. PCT/US2015/019982, Applicant Huawei Technologies Co., Ltd., dated Jun. 22, 2015, 15 pages.

* cited by examiner

| DL-UL CONFIGURATION | SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 MS | D | S | U | U | U | D | S | U | U | U |
| 1 | 5 MS | D | S | U | U | D | D | S | U | U | D |
| 2 | 5 MS | D | S | U | D | D | D | S | U | D | D |
| 3 | 10 MS | D | S | U | U | U | D | D | D | D | D |
| 4 | 10 MS | D | S | U | U | D | D | D | D | D | D |
| 5 | 10 MS | D | S | U | D | D | D | D | D | D | D |
| 6 | 5 MS | D | S | U | U | U | D | S | U | U | D |

*Fig. 3*
PRIOR ART

SYSTEM AND METHOD FOR RANDOM ACCESS

This application claims the benefit of U.S. Provisional Application No. 61/951,371, filed on Mar. 11, 2014, entitled "System and Method for Random Access in Multiple Wireless Channels," which application is hereby incorporated herein by reference.

TECHNICAL FIELD

The present disclosure relates generally to digital communications, and more particularly to a system and method for random access.

BACKGROUND

For current Third Generation Partnership Project (3GPP) Long Term Evolution (LTE) systems, uplink access is based on random access at the initial stage. Evolved NodeBs (eNBs) usually do not consider channel quality when allocating channels at the initial stage. In LTE there are random access channels for a user equipment (UE) to access, and UEs compete for access using different codes. There is a collision probability, and if collision happens the UEs back-off. If there is no collision, the eNBs assign resources for uplink data transmission and inform the assignments to the UEs using control channels.

Although current standards support channel quality reporting for the uplink, the channel quality reporting usually happens during data transmission and can result in a large amount of overhead, both in time and complexity for eNBs. This is typically not suitable for the case of a large number of UEs.

In the next generation cellular network, machine-to-machine (M2M)-type of communications will have wide application. M2M communications systems are usually characterized by large numbers of users, each with low data volumes and high delay-tolerance. Current systems should be adapted to accommodate to this trend. For example, if there are a large number of users, such as in M2M transmissions, and there is no mechanism to limit users, severe performance degradation may occur due to collisions, resulting in many resources being wasted.

SUMMARY OF THE DISCLOSURE

Example embodiments of the present disclosure which provide a system and method for random access.

In accordance with an example embodiment of the present disclosure, a method for operating a user device adapted to transmit data in a communications system in which available resources are divided into contention resources and non-contention resources is provided. The method includes selecting, by the user device, a first non-contention resource from the non-contention resources in accordance with selection information including at least one of channel condition, historical non-contention resource usage information, network node type, policy information, user device load information, and network node load information, the user device configured to transmit data on the first non-contention resource, determining, by the user device, a contention resource from a first plurality of contention resources associated with the first non-contention resource, in accordance with an association between the first plurality of contention resources and the first non-contention resource is known by the user device and a network node in the communications system, and transmitting, by the user device, a message on the contention resource, wherein the message initiates a random access procedure to obtain access to the selected first non-contention resource.

In accordance with another example embodiment of the present disclosure, a method for operating a device adapted to receive data from a first user device in a communications network with available resources divided into contention resources and non-contention resources is provided. The method includes detecting, by the device, at least one message on a first contention resource associated with a first non-contention resource, and when neither collision nor contention is detected, wherein contention is detected when the device receives a plurality of contention messages associated with the first non-contention resource from different user devices, receiving, by the device, a first message from the first user device on the first contention resource, and transmitting towards the first user device, by the device, an acknowledgment of the first message including an authorization to transmit using the first non-contention resource.

In accordance with another example embodiment of the present disclosure, a user device adapted to transmit data in a communications system in which available resources are divided into contention resources and non-contention resources is provided. The user device includes a processor, and a computer readable storage medium storing programming for execution by the processor. The programming including instructions to select a first non-contention resource from the non-contention resources in accordance with selection information including at least one of channel condition, historical non-contention resource usage information, network node type, policy information, user device load information, and network node load information, the user device configured to transmit data on the first non-contention resource, determine a contention resource from a first plurality of contention resources associated with the first non-contention resource, wherein the association between the first plurality of contention resources and the first non-contention resource is known by the user device and network nodes in the communications system, and transmit a message on the contention resource, wherein the message initiates a random access procedure to obtain access to the selected first non-contention resource.

In accordance with another example embodiment of the present disclosure, a device adapted to receive data from a first user device in a communications network with available resources divided into contention resources and non-contention resources is provided. The device includes a processor, and a computer readable storage medium storing programming for execution by the processor. The programming including instructions to detect at least one message on a first contention resource associated with a first non-contention resource, and when neither collision nor contention is detected, wherein contention is detected when the device receives a plurality of contention resources associated with the first non-contention resource from different user devices, receive a first message from the first user device on the first contention resource, and transmit towards the first user device an acknowledgment of the first message including an authorization to transmit using the first non-contention resource.

One advantage of an embodiment is that a collision-based uplink access technique using pre-assigned resource mappings is provided. The pre-assigned resource mappings allow the users to select the resources that they want to access.

A further advantage of an embodiment is that the collision-based uplink access technique has channel awareness and fairness. Therefore, large numbers of users are supported when channel conditions permit.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 3 illustrates example 3GPP LTE TDD frame configurations;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to random access. For example, a user device selects a first non-contention resource from the non-contention resources in accordance with selection information, the user device configured to transmit data on the first non-contention resource, determines a contention resource from a first plurality of contention resources associated with the first non-contention resource, in accordance with an association between the first plurality of contention resources and the first non-contention resource is known by the user device and a network node in the communications system, and transmits a message on the contention resource, wherein the message initiates a random access procedure to obtain access to the selected first non-contention resource.

The present disclosure will be described with respect to example embodiments in a specific context, namely communications systems that support random access for users. The disclosure may be applied to standards compliant communications systems, such as those that are compliant with Third Generation Partnership Project (3GPP), IEEE 802.11, and the like, technical standards, and non-standards compliant communications systems, that support random access for users.

Figure 1:
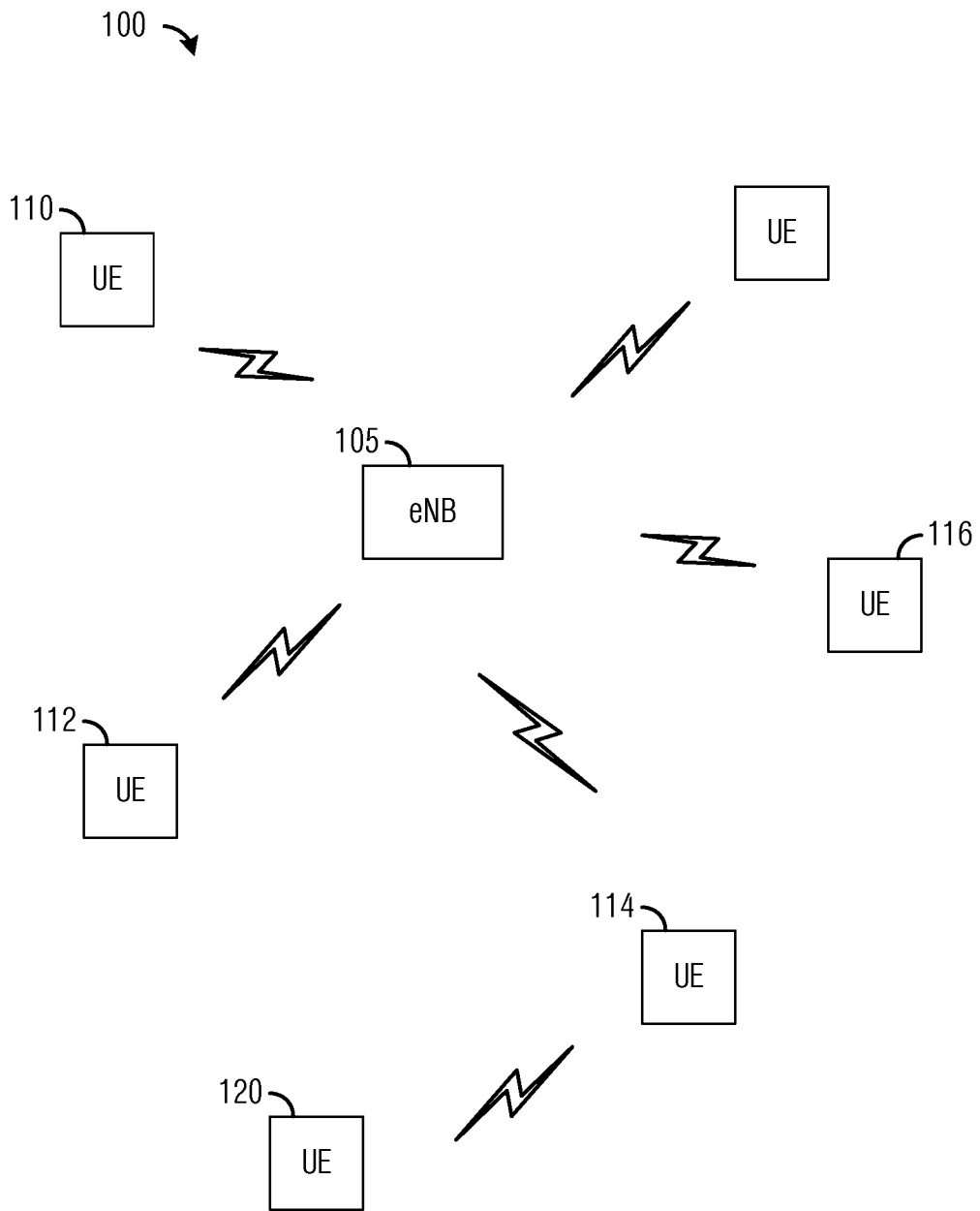
FIG. 1 illustrates an example communications system according to example embodiments described herein.

FIG. 1 illustrates an example communications system 100. Communications system 100 includes an evolved NodeB (eNB) 105 serving a plurality of user equipments (UEs), such as UE 110, UE 112, UE 114, and UE 116. eNB 105 is serving the plurality of UEs by receiving transmission intended for a UE and then forwarding the transmitting to the UE or receiving a transmission from a UE and then forwarding the transmission to its intended destination. In such a communications mode, eNB 105 and the plurality of UEs are said to be operating in a cellular mode. eNBs may also be commonly referred to as NodeBs, access points, base stations, controllers, communications controllers, and the like, while UEs may also be commonly referred to as mobiles, mobile stations, terminals, users, subscribers, stations, and the like. Network node is a more general term that encompasses eNB, NodeB, access point, base station, control, communications controller, and the like.

In a M2M application, a UE may also be a device that does not directly interact with humans. They may be sensors, detectors, information aggregators, and the like. As an illustrative example, a UE may be a weather sensor periodically measuring temperature, humidity, precipitation, air pressure, and the like, and reporting information to a weather processing device. As another illustrative example, a UE may be a door open/close sensor reporting door status to a security processing device whenever a change in the status of the door (door changes from open to close or from close to open, for example) occurs. As yet another illustrative example, a UE may be a health monitor periodically reporting health information (including but not limited to heart rate, breathing rate, blood oxygen level, blood pressure, blood glucose level, and the like) of a patient to a health processing device.

While it is understood that communications systems may employ multiple eNBs capable of communicating with a number of UEs, only one eNB, and a number of UEs are illustrated for simplicity.

Figure 2:
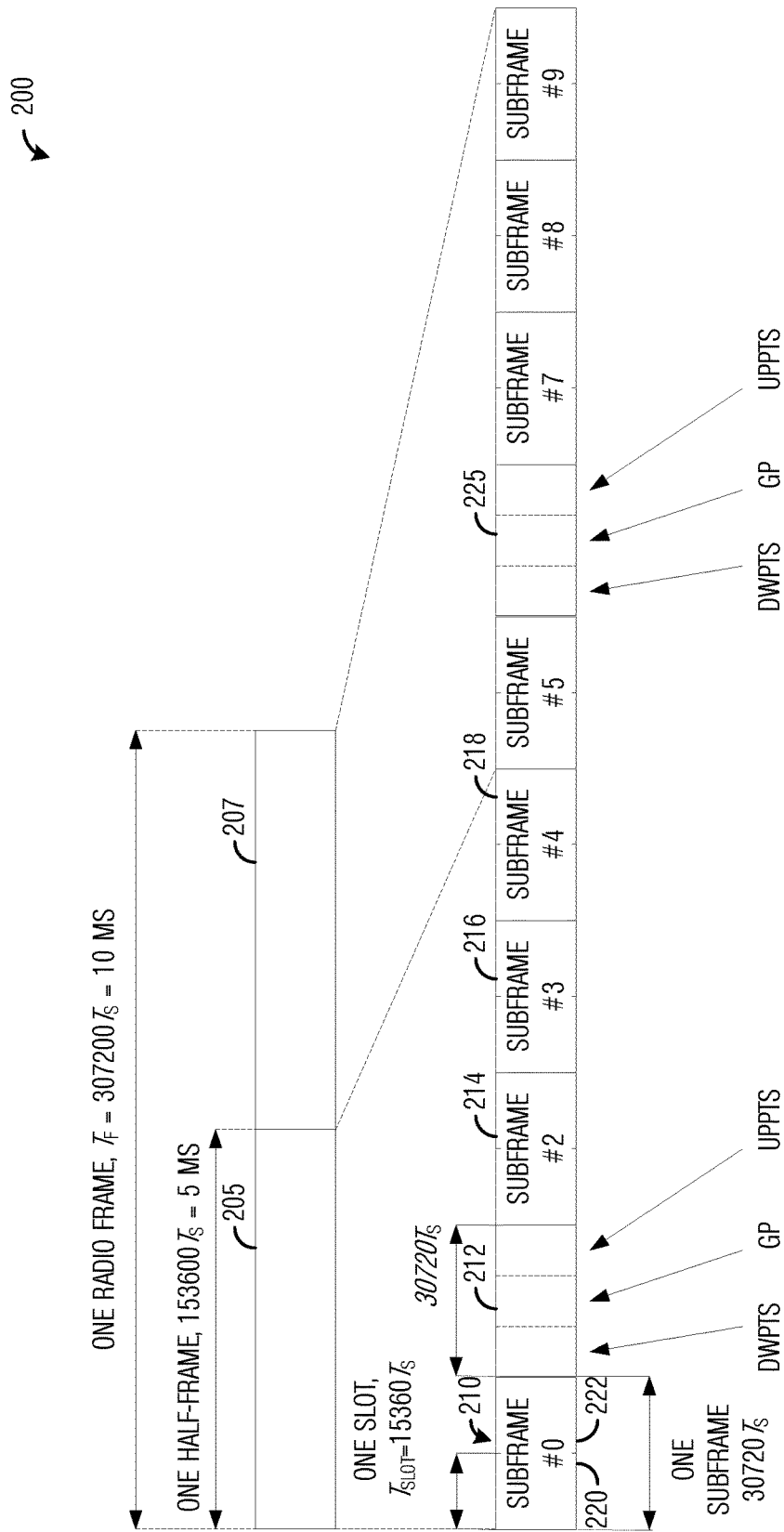
FIG. 2 illustrates an example 3GPP LTE time division duplexing (TDD) frame with 5 ms switch-point periodicity.

FIG. 2 illustrates an example 3GPP LTE time division duplexing (TDD) frame 200 with 5 ms switch-point periodicity. Frame 200 is 10 ms in duration with two half-frames 205 and 207 that are 5 ms in duration each. Each half-frame includes 5 sub-frames. As an example, half-frame 205 includes subframes 210, 212, 214, 216, and 218, labeled sub-frame #0, sub-frame #1, sub-frame #2, sub-frame #3, and sub-frame #4, respectively. A sub-frame generally includes two slots. As an example, sub-frame 210 includes a first slot 220 and a second slot 222. Exceptions include special sub-frames (sub-frame 212 and sub-frame 225) that allow a switching from downlink to uplink operation. The special sub-frames include a downlink pilot time slot (DwPTS), a guard period (GP), and an uplink pilot time slot (UpPTS).

FIG. 3 illustrates example 3GPP LTE TDD frame configurations 300. As shown in FIG. 3, a plurality of different 3GPP LTE TDD frame configurations is shown. Individual sub-frames are configured for downlink (DL) or uplink (UL) operations with the DL sub-frames shown as D sub-frames and the UL sub-frames shown as U sub-frames. The special subframes (as discussed above) are shown as S sub-frames.

Figure 4:
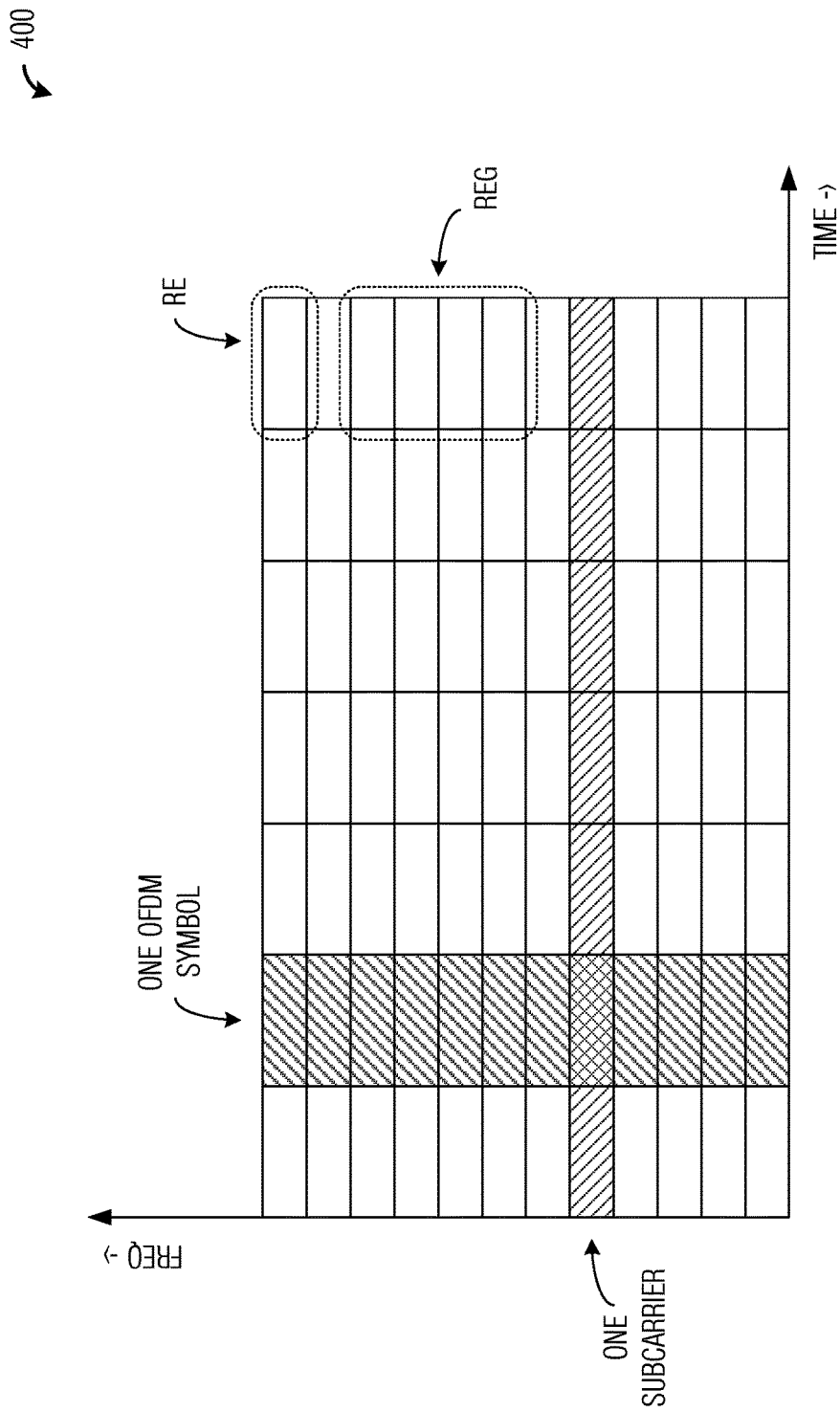
FIG. 4 illustrates an example 3GPP LTE resource block (RB)

FIG. 4 illustrates an example 3GPP LTE resource block (RB) 400. As shown in FIG. 4, RB 400 comprises 7 orthogonal frequency division multiplexed (OFDM) symbols in the time domain (0.5 ms, one slot) and 12 subcarriers in the frequency domain. Each OFDM symbol comprises 12 tones with each tone being 15 kHz wide and $1/14$ ms in duration. A single tone that is $1/14$ ms in duration is referred to as a resource element (RE), while a group of 4 REs is called a resource element group (REG). A control channel element (CCE) comprises 9 REGs. RB 400 comprises a total of 84 REs.

In 3GPP LTE TDD communications systems, control channels are configured using units of REGs or CCEs, while traffic channels are configured using units of RBs. A physical random access channel (PRACH) is used to support random access and has at most 6 RBs and 72 subcarriers. According to 3GPP Technical Standards (TS) 36.211, 36.300, 36.321 and 36.331, there are at most 64 preamble sequences within one cell. The PRACH density per frame (10 ms) can be 0.5, 1, 2, 3, 4, 5, or 6. Therefore, the available preambles per frame can be 0.5*64, 1*64, 2*64, 3*64, 4*64, 5*64, or 6*64. As an illustrative example, the available number of preambles per frame of 1*64 means that if 64 users choose different preamble sequences, then there is no collision (i.e., when multiple users select and transmit different preamble sequences). However, because each user selects preamble sequences independently, it is very likely that collisions will happen due to the same preamble sequences being randomly selected by different users.

Figure 5:
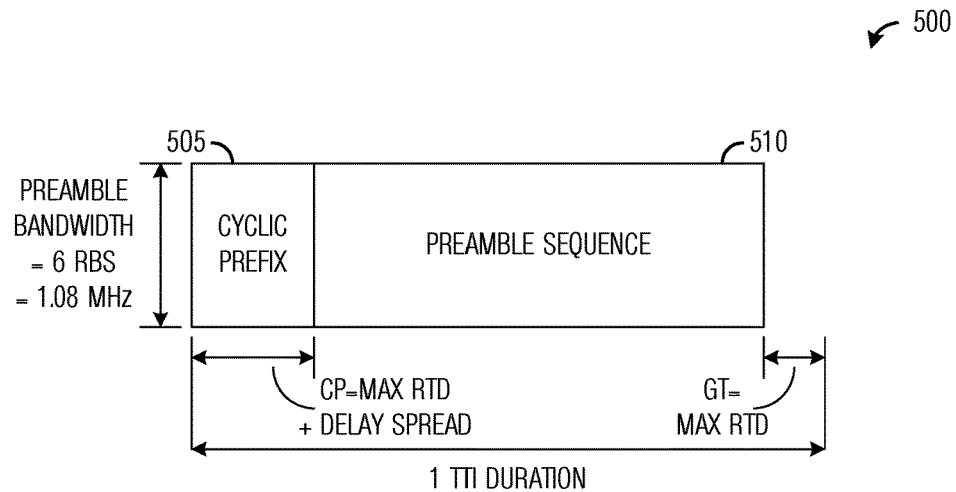
FIG. 5 illustrates an example 3GPP LTE preamble.

FIG. 5 illustrates an example 3GPP LTE preamble 500. Preamble 500 includes a cyclic prefix (CP) 505 and preamble sequence 510. CP 505 may have a duration equal to a sum of a maximum round trip delay (RTD) and a delay spread. Preamble 500 may have a duration equal to 1 transmit time interval (TTI) minus the maximum RTD. Preamble 500 may have a bandwidth of 6 RBs or 1.08 MHz.

In contention-based random access (such as 3GPP LTE random access, for example), a UE selects a preamble out of a first plurality of preambles signaled to it in the form of system broadcast information, and sends the preamble to an eNB. In non-contention-based random access, an eNB assigns a non-contention random access preamble to a UE and the UE sends the preamble to the eNB when it wants access. The non-contention random access preamble belongs to a second plurality of random access preambles that is different from the first plurality of preambles signaled in the system broadcast information and used in contention-based random access. In other words, the non-contention random access preamble is not a member of the first plurality of preambles signaled in the system broadcast information.

Figure 6:
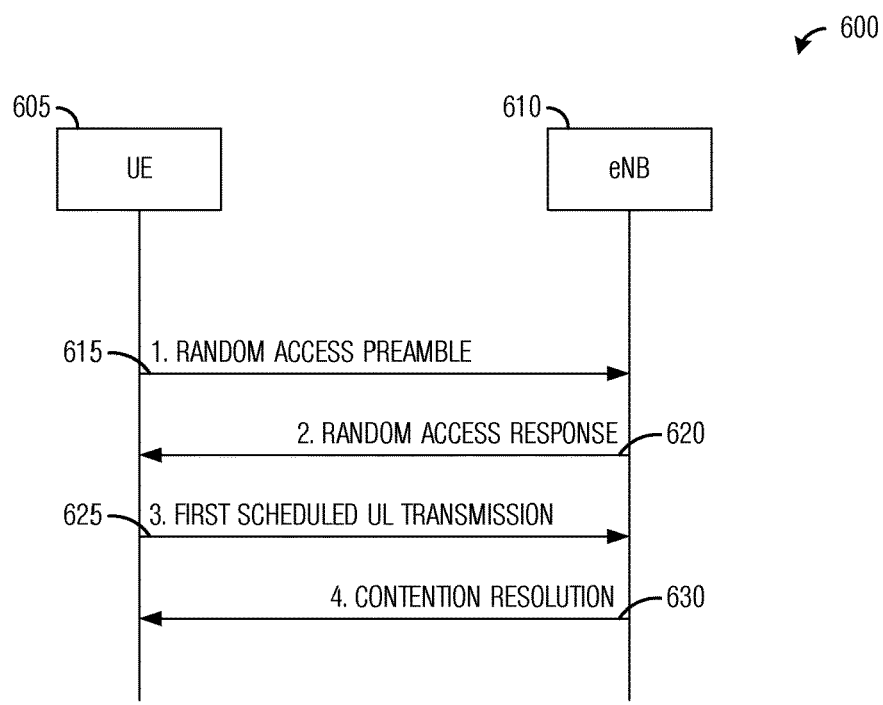
FIG. 6 illustrates a message exchange diagram highlighting example messages exchanged during a 3GPP LTE random access procedure.

FIG. 6 illustrates a message exchange diagram 600 highlighting example messages exchanged during a 3GPP LTE random access procedure. The 3GPP LTE random access procedure may be an example of contention-based random access. Diagram 600 includes messages exchanged between a UE 605 and an eNB 610. In general, the 3GPP LTE random access procedure begins when UE 605 selects a preamble and sends the selected preamble to eNB 610 (shown as event 615). UE 605 also includes frequency and frame number of PRACH with the selected preamble. eNB 610 responds by sending a random access response to UE 605 (shown as event 620). A single random access response may respond to requests from several UEs, and may include a preamble index and frequency and frame numbers of PRACH. The random access response also conveys uplink resources for a subsequent transmission by UE 605. If UE 605 does not receive the random access response, it may back off (i.e., wait for a period of time) and try the random access procedure again.

If UE 605 receives the random access response from eNB 610, it transmits a first scheduled uplink transmission over uplink resources included in the random access response (shown as event 625). As an illustrative example, the first scheduled uplink transmission may include a radio resource control (RRC) connection request generated by a RRC layer of UE 605. The RRC connection request may include an identifier of UE 605, i.e., the UE ID. eNB 610 may send a contention resolution message that conveys a decoded version of information included in the first scheduled uplink transmission from UE 605 (shown as event 630).

According to an example embodiment, communications resources of a communications system are divided into contention resource and non-contention resources. As an illustrative example, in a 3GPP LTE communications system, the preambles (Zadoff-Chu sequences) are the contention resources, while in Universal Mobile Telecommunications System (UMTS) communications systems, Walsh-Hadamard sequences are used as preambles (contention resources). In a 3GPP LTE communications system, RBs are the non-contention resources. With respect to a random access procedure, contention resources may be used by one or more UEs to obtain access to non-contention resources.

Furthermore, there can be some resources separately kept as scheduled resources, which are scheduled by the eNB and inform to specific users over a downlink control channel. The resource partitioning among different type of resources may be broadcast to users and there is a specific time these broadcast changes are applied in the system.

According to an example embodiment, multiple contention resources are associated with the non-contention resources. As an illustrative example, for each non-contention resource or grouping thereof, there are multiple contention resources. In a 3GPP LTE communications system, a plurality of preambles is associated with a RB. The association between the contention resources and the non-contention resources are known by both UEs and eNBs. Hence, when an eNB receives a preamble, it knows which non-contention resource the UE that sent the preamble is intending to use.

According to an example embodiment, a UE selects one or more non-contention resources and uses contention resources associated with the one or more non-contention resources to attempt to obtain access to the one or more non-contention resources. The selection of the one or more non-contention resources may be made in accordance with a threshold criterion that may be pre-specified by a technical standard, an operator of the communications system, an eNB, and the like. The number of non-contention resources that the UE selects may be based on non-contention resource selection criterion such as past usage history of the UE (i.e., how many non-contention resources the UE has used in the last few time periods), priority of the UE, as well as communications parameters provided by the eNB. It is noted that multiple eNBs may respond to the random access attempt by the UE. Furthermore, since multiple eNBs may respond, the UE does not need to know with which eNB they are communicating.

Figure 7:
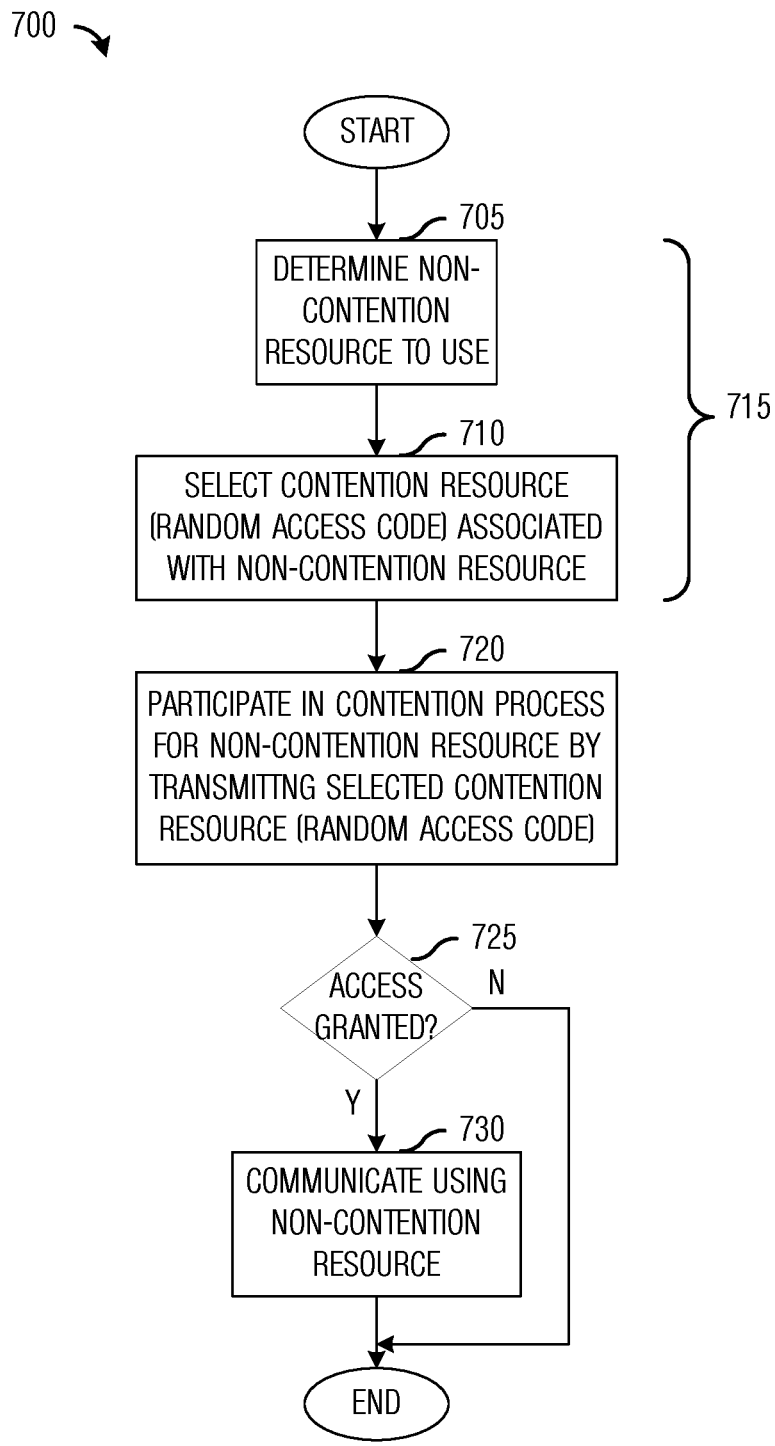
FIG. 7 illustrates a flow diagram of example operations occurring in a UE participating in a random access procedure to obtain access to one or more non-contention resources according to example embodiments described herein.

FIG. 7 illustrates a flow diagram of example operations 700 occurring in a UE participating in a random access procedure to obtain access to one or more non-contention resources. Operations 700 may be indicative of operations occurring in a UE as the UE participates in a random access procedure using contention resources to obtain access to one or more non-contention resources.

Operations 700 may begin with the UE selecting a non-contention resource to use (block 705). The UE may select one or more non-contention resources to use in a transmission. The UE may utilize selection information provided by a technical standard, an operator of the communications system, an eNB, and the like, to determine which one or more non-contention resources to use in the transmission. As an illustrative example, the selection information is a channel condition (e.g., downlink channel condition for communications resources of the communications system, uplink channel condition for communications resources, or both) of communications resources that is compared with a threshold associated with the non-contention resources. The UE may select the one or more non-contention resources if the threshold is met.

The non-contention resources may differ in size, for example in time and frequency and prepared as virtual resources. The users may receive a mapping of the virtual resources to the real physical resources. Furthermore, the users may receive information which preambles will be mapped to the virtual resources.

The resource areas may be changed dynamically based on the network load for each type of virtual resources. As an illustrative example, there may be several high capacity (e.g. large number of RBs) virtual resources and when the demand for these high capacity resources reduces, eNB may move to several small capacity resources.

As an illustrative example, the selection information is historical non-contention resource usage information. Historical non-contention resource usage information may be used to determine a number of non-contention resources that it will attempt to obtain access to. If the UE has obtained access to a large number of non-contention resources within a specified time duration in the past, the UE may determine that it will attempt to obtain access to a small number of non-contention resources. Conversely, if the UE has obtained access to a small number (or zero) of non-contention resources within the specified time duration in the past, the UE may determine that it will attempt to obtain access to a large number of non-contention resources.

As an illustrative example, the selection information also includes eNB type (e.g., macro cell, pico cell, femto cell, and the like), policy information provided by an eNB, UE load information, load information from eNB(s), and the like. The eNB type may determine which of the non-contention resources are available for use by the UE, while policy information may determine a number of non-contention resources the UE may attempt to obtain access to. UE load may determine a number of non-contention resources the UE may attempt to obtain access to, while eNB load information may determine the number as well as which non-contention resources are available for use by the UE.

As an illustrative example, the UE may determine the number of non-contention resources and a priority index for each non-contention resource in accordance with its own historical non-contention resource usage information and the channel condition of the non-contention resources. If the priority for a non-contention resource is above a threshold that is signaled to the UE by an eNB, the UE can attempt to obtain access to the non-contention resource using a contention resource associated with the non-contention resource.

A detailed discussion of an example technique for determining non-contention resources to use by a UE based on a selection information is provided below.

The UE may determine a contention resource for each one of the one or more non-contention resources that it has selected to obtain access to (block 710). As discussed previously, associations between contention resources (e.g., preambles in 3GPP LTE or UMTS systems) and non-contention resources (e.g., RBs) are provided to the UE by a technical standard, an operator of the communications system, an eNB, and the like. As an illustrative example, if a first non-contention resource has 4 contention resources associated with it, the UE may select (randomly or deterministically) one of the 4 contention resources, while if a second non-contention resource has 3 contention resources associated with it, the UE may select (randomly or deterministically) one of the 3 contention resources. Collectively, blocks 705 and 710 may be referred to as selecting non-contention resources to attempt to obtain access to (blocks 715).

The UE may transmit the selected contention resource(s) (block 720). The UE may participate in a random access procedure by transmitting the selected contention resource(s). For discussion purposes, consider a situation wherein the UE has selected one non-contention resource to obtain access to and the non-contention resource has 4 associated contention resources. The UE selects one of the 4 contention resources associated with the non-contention resource and transmits the contention resource. As an illustrative example, in a 3GPP LTE communications system, the UE has selected to contend for access to a RB that is associated with 4 preambles. The UE may select one of the 4 preambles and transmits the selected preamble.

The UE may perform a check to determine if it has been granted access to the non-contention resource(s) (block 725). If only the UE attempted to obtain access to the non-contention resource(s), there is no collision and the eNB may send an acknowledgement to the UE to inform the UE that it has obtained access to the non-contention resource. If multiple UE are competing for the non-contention resource(s) with different contention resources that are associated with the non-contention resource(s), the eNB may select one UE out of the multiple UEs. The eNB may send the acknowledgement by sending a preamble index to UE (the preamble index the user used for contention-based access). In subsequent transmissions, the UE may send its own ID for further communication using scheduled resources.

The selection by the eNB may be in accordance with priorities of the UEs if the priorities of the UEs are provided by the UEs along with the contention resource, for example. If the priorities of the UEs are not provided, the eNB may select the UE in accordance with its own priority assessment. The priority assessment of the eNB may be based in part on previous UE selections, non-contention resource channel information, and the like. It is noted that if contention resource transmissions made by the multiple UEs all collide, the eNB may choose to use its own priority evaluation for transmissions. The priority evaluation used by eNB may be pre-specified by a technical standard, an operator of the communications system, an eNB, and the like. If there are no requests for a non-contention resource, the eNB may allocate the non-contention resource using its own evaluation of a UE that it knows has data for transmission, for example.

If the UE received the acknowledgement from an eNB, then it was given access to use the non-contention resource. The UE may then communicate using the non-contention resource (block 730). If the UE did not receive an acknowledgment, operations 700 may terminate. Alternatively, if the UE did not receive an acknowledgement, the UE may back off for a duration of time and return to block 705 to re-attempt the random access process.

Figure 8:
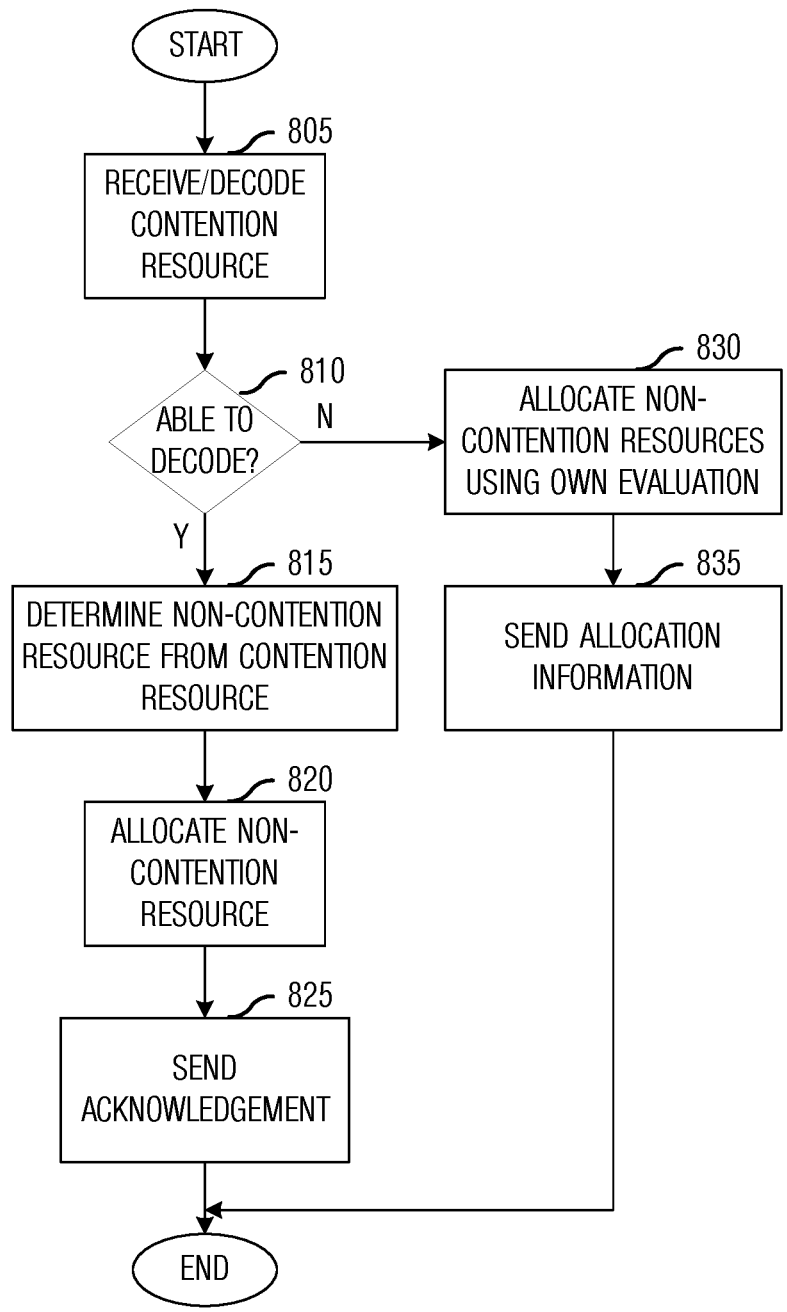
FIG. 8 illustrates a flow diagram of example operations occurring in an eNB participating in a random access procedure to grant access to one or more non-contention resources according to example embodiments described herein.

FIG. 8 illustrates a flow diagram of example operations 800 occurring in an eNB participating in a random access procedure to grant access to one or more non-contention resources. Operations 800 may be indicative of operations occurring in an eNB as the eNB participates in a random access procedure using contention resources to grant access to one or more non-contention resources.

Operations 800 may begin with the eNB detecting transmissions on contention resources (block 805). As an illustrative example, the eNB may detect that a transmission(s) has occurred on a contention resource when signal levels on the contention resource is greater than a background noise level. If the eNB detects that there is a transmission(s) on a contention resource, it may attempt to decode the transmission(s), such as by using blind detection, for example. The eNB may perform a check to determine if it was able to successfully decode any of the contention resources (block 810). If the eNB was able to decode at least one contention resource, the eNB may determine a non-contention resource(s) from the contention resource(s) (block 815). As discussed previously, the association between non-contention resources and contention resources are known by both the eNB and the UEs, so if the eNB is able to decode the contention resource(s), it is able to determine the non-contention resource(s) associated with the contention resource(s). If the eNB was able to decode a plurality of contention resources associated with the same contention resource, the eNB may select a UE out of the plurality of UEs that sent the plurality of contention resources based on a priority of the UEs either provided by the UEs or generated by the eNB. The eNB may allocate the non-contention resource(s) based on the contention resource(s) (block 820). The eNB may send an acknowledgement(s) to the UE(s) that was allocated the non-contention resource(s) (block 825).

The acknowledgement may be sent as an allocation of resources using a preamble index used by the UE in the contention slot as the UE ID using the downlink control channel. In the case of a collision, since the eNB is aware of the collision, but does not know which UEs collided, the eNB may send data to an already identified UE.

According to an example embodiment, the UE identification information is sent in the second transmission to the eNB so that the eNB can allocate resources to the UE as a scheduled user. For example, if at Time T1, the UE requests through a preamble in the contention based resource, then at Time T2, the eNB may acknowledge the preamble in a subsequent frame so that the UE knows that it can transmit in that contention resources in the following time slot (T3). However, if there is a collision, the eNB can detect and use the corresponding contention based resource for a different UE by sending the allocation in the downlink control channel in Time T2, if the eNB already has a UE who already has data to be sent, and identification information has already been identified. In the next time (Time T3), after the acknowledgement, data transmission from the UE to the eNB may occur over non-contention resources.

This identification information and amount data that needs to be transmitted can be sent to the eNB by the UE after the initial contention period (e.g., in a manner similar to MSG3 in the LTE random access process).

If the eNB was not able to decode any contention resources, the eNB may allocate non-contention resources using its own evaluation of the UEs (block 830). As an illustrative example, the eNB may select UEs based on its knowledge of UEs with data to transmit along with their respective priorities. As yet another illustrative example, the eNB may select UEs based on the UEs historic usage information. As yet another illustrative example, the eNB may select UEs based on the UEs historic usage information and its knowledge of UEs with data to transmit along with their respective priorities. The eNB may send allocation information to the UEs (block 835).

According to an example embodiment, channel quality information is used in selecting non-contention resources (e.g., uplink channels). A UE may autonomously select a non-contention resource as well as an eNB based on its own conditions. Fairness may be achieved in a distributed manner. Less delay is imposed while supporting large numbers of UEs.

According to an example embodiment, one or more of the following is provided:

An association of contention resources (e.g., preambles) to non-contention resources (e.g., RBs) to make the uplink scheduling channel aware;

The transparent selection of any eNB according to loading (i.e., load balancing) and channel conditions considering eNB fairness;

An association of a number of contention resources to a non-contention resource is performed and signaled using a broadcast of the association information or association map; and A changing the association information or association map based on historical information and evaluation thereof.

According to an example embodiment, one or more of the following is provided:

A distribution of non-contention resource requests (i.e., contention resource transmissions) is made over a plurality of time periods to help prevent an excessive number of collisions;

The full utilization of contention resource detection to generally ensure full non-contention resource utilization;

A reduction in complexity at eNBs for achieving policy based scheduling allows simpler implementation in existing communications systems;

Improved performance over existing communications systems;

Ensuring that UE's capabilities contribute to the scheduling process; and

Flexibility in achieving different scheduling policies.

Figure 9:
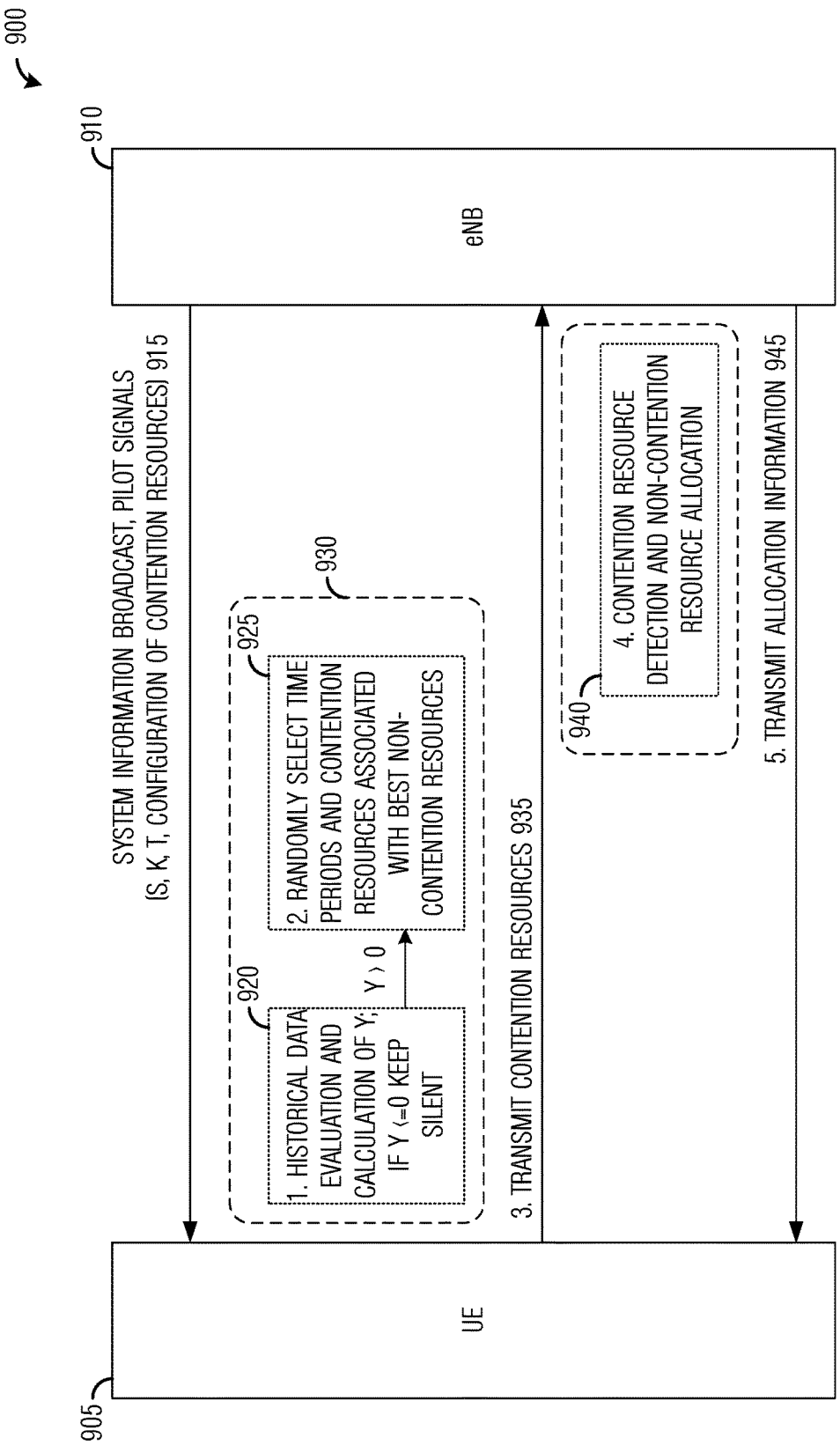
FIG. 9 illustrates an example communications system highlighting interaction between a UE and an eNB according to example embodiments described herein.

FIG. 9 illustrates an example communications system 900 highlighting interaction between a UE and an eNB. Communications system 900 includes a UE 905 and an eNB 910. Transmissions between UE 905 and eNB 910, as well as processing performed at UE 905 and eNB 910, are shown in FIG. 9. eNB 910 may transmit system information to UEs (including UE 905) that are within its coverage area (shown as event 915). The system information may be broadcast by eNB 910. The broadcasts may be periodic in nature. Alternatively, whenever a change is made to the system information, eNB 910 may broadcast the system information at a closest opportunity after the change has been made.

The system information may include typical system configuration information transmitted by an eNB in a communications system, such as pilot signals, beacons, timing information, identifying information, and the like. The system information may also include parameters used in the scheduling of uplink transmissions. The parameters used in the scheduling of uplink transmissions may include: S, K, T, and a configuration of contention resources (which may include association information or an association map of contention resources to non-contention resources), where L is the number of available non-contention resources (e.g., RBs) for uplink traffic, M is the number of UEs within one cell, P is the number of contention resources (e.g., preambles) within one cell, S=floor(P|L) is the number of contention resources associated with one non-contention resource (the UEs may select contention resources associated with one non-contention resource to indicate to the eNB that this non-contention resource is the non-contention resource that they wish to use to make an uplink transmission), T=ceiling(M/L) is the number of time periods for historical data evaluation, where one time period is one non-contention resource time duration, and K=max{floor (L|M),1} is the number of non-contention resources per UE in T time periods on average.

UE 905 may, at every T time periods, determine historical usage information (e.g., a number of non-contention resources used in the past T time periods, X) and use the historical usage information to determine a number of non-contention resources to be used in the next T time periods, Y (shown as event 920). As an illustrative example, the determination of Y in accordance with X may be as follows:

If $X = 0, Y = 2*K$;

If $X = 1, Y = 2*K - 1$;

...

$Y = 2*K - X.$

If Y is less than or equal to 0, UE 905 may not attempt to obtain access to any non-contention resources in the next T time periods. This example technique tries to ensure that for every two T time periods, every UE has an opportunity to access an equal number of non-contention resources.

UE 905 may select the best non-contention resources to attempt to obtain access to (shown as event 925). As an illustrative example, if T=1 and Y>=1, UE 905 may attempt to obtain access to its best Y non-contention resources in accordance with channel measurements in the following non-contention resource time period. While if T>1 and Y>=1, UE 905 may select Y non-contention resources from the following T time periods and attempt to obtain access to its best non-contention resource in accordance with channel measurements in every selected time period. Collectively, events 920 and 925 may be referred to as selecting non-contention resources (blocks 715 of FIG. 7).

For every non-contention resource of the Y best non-contention resources of UE 905, UE 905 may select (randomly or deterministically) one of the S contention resources associated with the non-contention resource and transmit the contention resource to eNB 910 or for every one of the T time periods, UE 905 may select (randomly or deterministically) one of the S contention resources associated with the non-contention resource and transmit the contention resource to eNB 910 (shown as event 935).

eNB 910 may perform contention resource detection and non-contention resource allocation (shown as event 940). eNB 910 may try to satisfy the preference of UE 905 if possible. In other words, if eNB 910 is able to successfully decode the contention resource from UE 905 and if no other UE has attempted to obtain access to the non-contention resource, eNB 910 may grant access to UE 905. However, if multiple UEs have attempted to obtain access to a single non-contention resource, eNB 910 may use any of a variety of techniques (such as, UE priority, UE service history, UE data queue size, communications system load, and the like) to select a UE to grant access to the non-contention resource.

If, after allocating non-contention resources in accordance with contention resources received and decoded, there are some unallocated non-contention resources, eNB 910 may allocate the unallocated non-contention resources to avoid wasting resources. As an illustrative example, eNB 910 may allocate the non-contention resources evenly while making use of UE priority as follows:

a) UEs detected by eNB 910 but without non-contention resource allocations. The UEs in this group may have transmitted contention resources that did not collide but they were still not allocated non-contention resources since only one UE selected from all decoded UEs may be granted access to one non-contention resource.

b) UEs detected by eNB 910 with non-contention resource allocations.

It is noted that other techniques may be used to allocate unallocated non-contention resources. Therefore, the illustrative example presented herein should not be construed as being limiting to either the scope or the spirit of the example embodiments.

eNB 910 may transmit allocation information regarding the non-contention resource allocation to UE 905 (shown as event 945).

Figure 10:
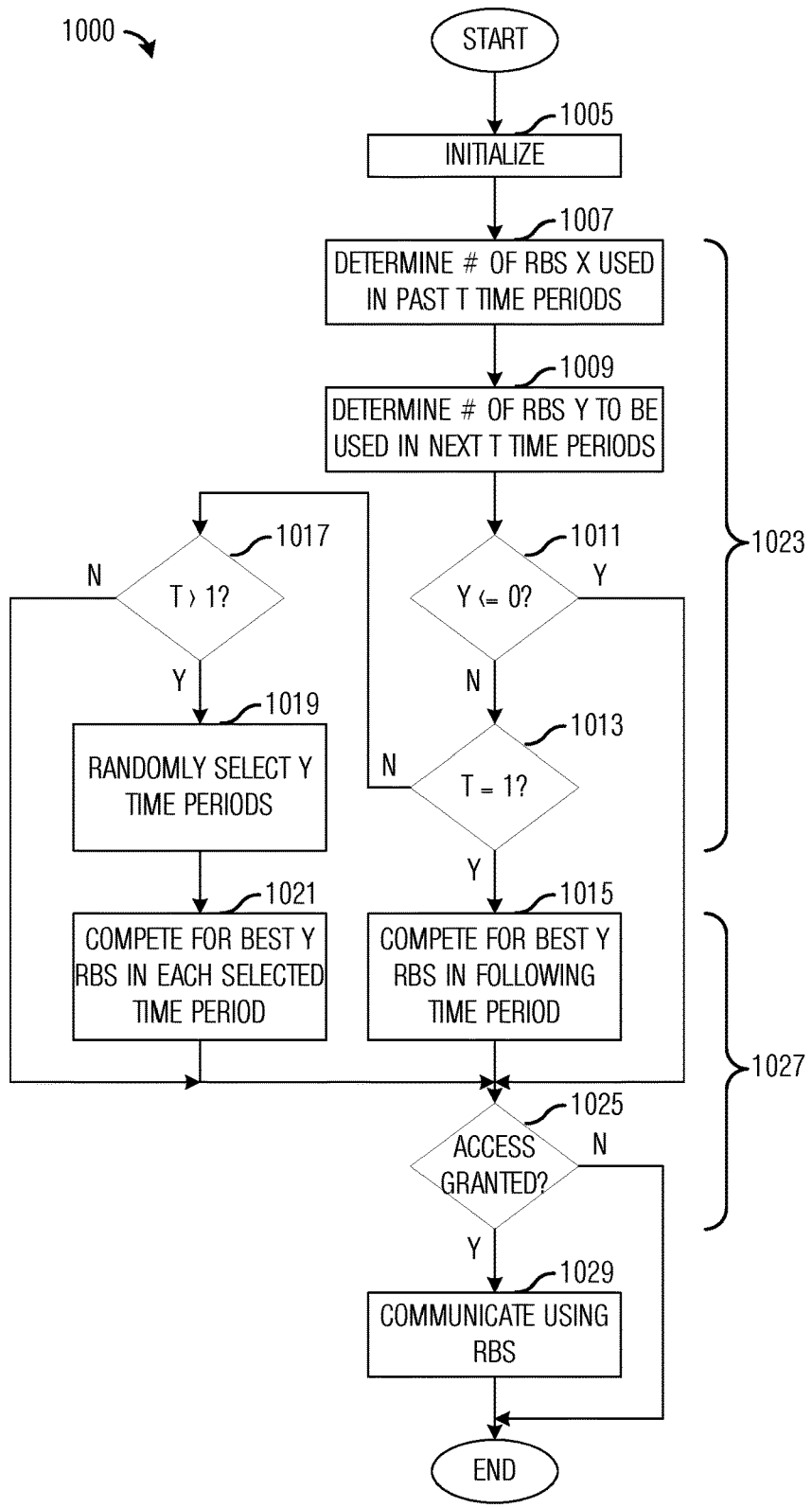
FIG. 10 illustrates a flow diagram of example operations occurring in a UE participating in a random access procedure to obtain access to one or more non-contention resources, highlighting an example technique for selecting non-contention resources to ensure fairness according to example embodiments described herein.

FIG. 10 illustrates a flow diagram of example operations 1000 occurring in a UE participating in a random access procedure to obtain access to one or more non-contention resources, highlighting an example technique for selecting non-contention resources to ensure fairness. Operations 1000 may be indicative of operations occurring in a UE as the UE participates in a random access procedure using contention resources to obtain access to one or more non-contention resources.

Operations 1000 may begin with the UE initializing (block 1005). Initializing may include the UE receiving system information broadcast by an eNB. The system information may include typical system configuration information transmitted by an eNB in a communications system, such as pilot signals, beacons, timing information, identifying information, and the like. The system information may also include parameters used in the scheduling of uplink transmissions. The parameters used in the scheduling of uplink transmissions may include: S, K, T, and a configuration of contention resources (which may include association information or an association map of contention resources to non-contention resources).

The UE may determine a number of non-contention resources (e.g., RBs) that it has used in the last T time periods, X (block 1007). X may be an example of historical usage information that the UE may use to select non-contention resources to attempt to obtain access to in a fair manner. The UE may determine a number of non-contention resources that it will use in the next T time periods, Y (block 1009).

If Y>0 and T=1 (blocks 1011 and 1013), the UE may compete for the best Y non-contention resources in the next time period (block 1015). The UE may compete for the best Y non-contention resources by selecting a contention resource for each of the Y non-contention resource and transmit the selected contention resources.

If Y>0 and T>1 (blocks 1011 and 1017), the UE may compete for the best non-contention resource in the next Y time periods (block 1019). The UE may compete for the best non-contention resource in the next Y time periods by selecting a contention resource for the best non-contention resource in each of the next Y time periods and transmit the selected contention resources.

Collectively, blocks 1007, 1009, 1011, 1013, 1017, and 1019 may be referred to as selecting non-contention resources to attempt to obtain access to (blocks 1023).

The UE may perform a check to determine if it has been granted access to one or more contention resources (block 1025). As an illustrative example, if the UE has received an acknowledgement from the eNB corresponding to a contention resource, then the UE has been granted access to a non-contention resource associated with the contention resource. Alternatively, if the UE has received allocation information for a non-contention resource from the eNB, then the UE has been granted access to the non-contention resource. Collectively, blocks 1015, 1021 and 1025 may be referred to as participating in contention process (block 1027). The UE may communicate using the non-contention resource (block 1029).

According to an example embodiment, the number of random access requests (i.e., the transmissions of contention resources) is regulated and limited. Limiting and regulating the number of random access requests may be achieved by using a threshold value on channel status information (CSI) to select non-contention resources.

According to an example embodiment, the following technique is provided:

1) All contention resources are divided into L groups, where L is also the total number of non-contention resources. Each non-contention resource is associated with (number of contention resources/L) contention resources. As an illustrative example, 192/60=3 contention resources per non-contention resource, with contention resources 1, 2, 3 being associated with a first non-contention resource, and contention resources 4, 5, 6 being associated with a second non-contention resource, and so on.

2) Each UE determines in which non-contention resource it has the largest CSI and compares this value with a threshold; if the CSI is greater than the threshold, then the UE is a candidate user for the non-contention resource (if this is a single-cell scenario, there may be no need to check for interference to other cells).

3) A UE randomly selects a contention resource from the set of contention resources associated with its selected non-contention resource, and sends the selected contention resource to the eNB.

4) If the UE is selected by the eNB, the UE may use the selected non-contention resource for transmission. If not, then the UE keeps silent and retries in the next time period.

According to an example embodiment, the use of a threshold effectively prevents excessive collisions from deteriorating the throughput of the communications system and increases the utilization of the available non-contention resources as the number of UEs increase. The use of the threshold may help to ensure that each UE is using the best non-contention resource(s) for its transmission. The total throughput may increase with increasing number of UEs as a result of multi-user diversity.

According to an example embodiment, a dual-mode random access technique is presented. As an illustrative example, when the number of users is low, a simple random access technique that does not consider historical usage information may be used, such as the 3GPP LTE random access technique. However, when the number of users is high, a random access technique that does consider historical usage information may be used, such as one of the techniques presented herein.

According to an example embodiment, a plurality of mini-channels is associated with each non-contention resource to increase efficiency. The mini-channels may be allocated to different UE to allow the sharing of a non-contention resource when individual UEs do not have sufficient data to completely utilize the available bandwidth of the non-contention resource.

According to an example embodiment, an indicator may be used to represent selected contention resources. As an illustrative example, if there are 3 contention resources per non-contention resource, then a 2-bit indicator can represent the selected contention resource:

00: no winner;
01: $1^{st}$ contention resource;
10: $2^{nd}$ contention resource; and
11: $3^{rd}$ contention resource.

The 2-bit indicator may be mapped to a single broadcast vector, with each 2 bits providing the winning contention resource for a particular non-contention resource.

Figure 11:
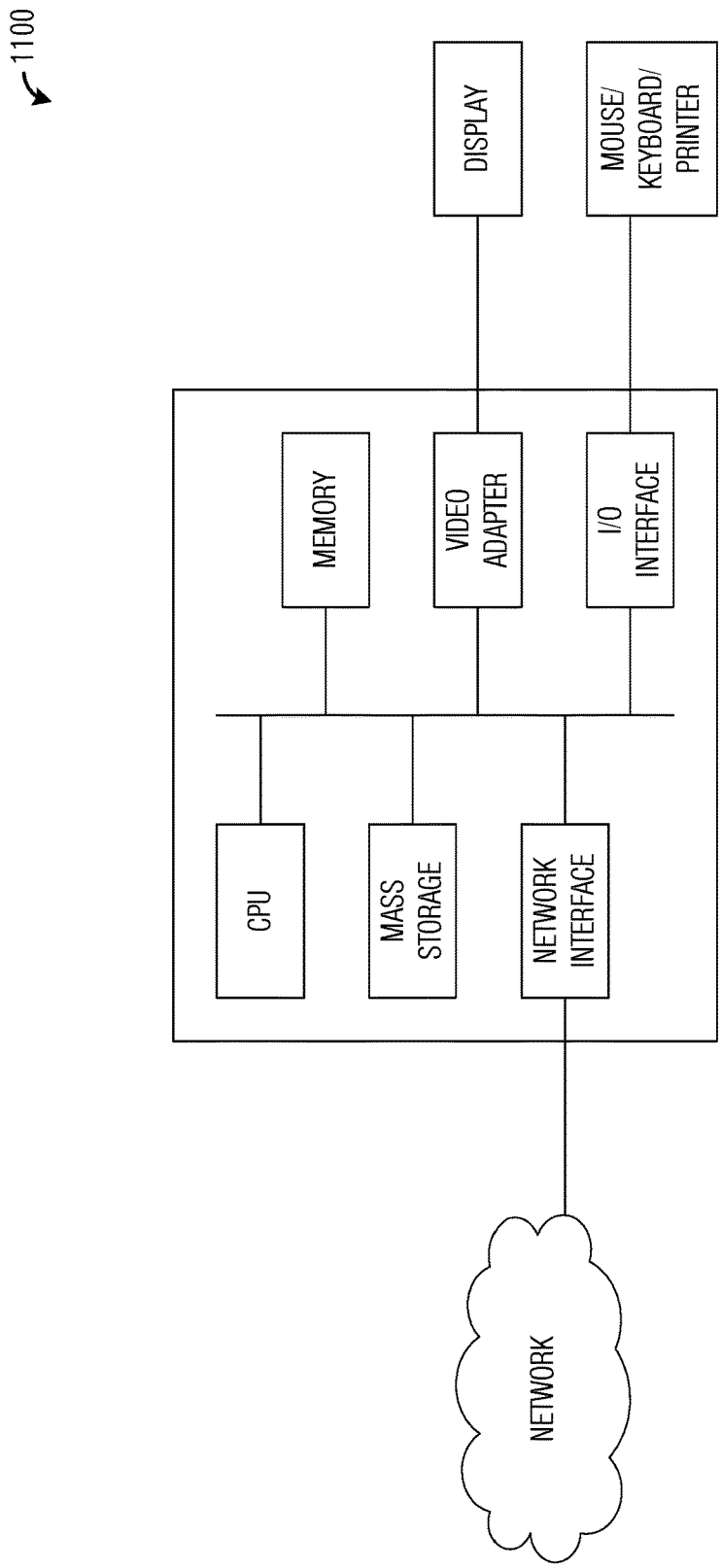
FIG. 11 is a block diagram of a processing system that may be used for implementing the devices and methods disclosed herein.

FIG. 11 is a block diagram of a processing system 1100 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Advantageous features of example embodiments may include: A method for receiving data from a user device in a network, the method comprising: dividing available resources into contention-based mini-channels and non-contention-based data resource blocks (DRBs), wherein each DRB is associated with a group of mini-channels; announcing, by one or more access points (APs), the DRBs associated with the groups of mini-channels; providing, by the one or more APs, a downlink channel condition, a base station type, policy information, historical data evaluation, and/or load information to the user device for use in selecting one or more of the DRBs; receiving, by the one or more APs, a transmission from the user device on one or more randomly selected mini-channels associated with each selected DRB; acknowledging, by the one or more APs, the user transmission when no collision or contention is detected; and receiving data from the user device using the selected one or more DRBs.

The method could further include, wherein the one or more APs send a selected user device ID or a preamble index when there are multiple collision-free preambles existing per a given RB. The method could further include, wherein the one or more APs provide access to a highest priority user device.

The method could further include, wherein, when there are no collision-free preambles for or other user devices contending for a given RB, a strongest AP for the user device sends a separate assignment for the user device in a control/broadcast channel. The method could further include, wherein the strongest AP selects the user device for the given RB in accordance with previously-sent priority values or previous collision free-access attempts.

The method could further include, wherein when the data received from the user device has a preamble, receiving a priority metric evaluated by the user device. The method could further include, wherein the one or more APs transmit a threshold value to the user device for use in determining when to attempt access. The method could further include, wherein the threshold is evaluated using the load of the AP. The method could further include, wherein the priority metric is evaluated using a downlink signal-to-noise-plus-interference-ratio observed by the user device and its previous transmissions.

The method could further include, wherein the mini-channels are multiplexed in accordance with code/preamble division, time division, or frequency division.

Advantageous features of example embodiments may include: A method for a user device to transmit data to a network in which available resources are divided into contention-based mini-channels and non-contention-based data resource blocks (DRBs), wherein each DRB is associated with a group of mini-channels, the method comprising: receiving, by the user device from one or more access points (APs), an announcement of the DRBs associated with the groups of mini-channels; selecting, by the user device, one or more of the DRBs in accordance with a downlink channel condition, a base station type, policy information, historical data evaluation, and/or load information received from the one or more APs; sending, by the user device, a transmission on one or more randomly selected mini-channels associated with each selected DRB; receiving, by the user device, an acknowledgment of the transmission when no collision or contention is detected; and sending data using the selected one or more DRBs.

The method could further include, further comprising receiving a selected user device ID or a preamble index from the one or more APs when there are multiple collision-free preambles existing per a given RB. The method could further include, wherein the user device is a highest priority user device, and the user device receives access from the one or more APs.

The method could further include, wherein, when there are no collision-free preambles for or other user devices contending for a given RB, the user device receives a separate assignment in a control/broadcast channel from a strongest AP. The method could further include, wherein user device is selected by the strongest AP for the given RB in accordance with previously-sent priority values or previous collision free-access attempts.

The method could further include, further comprising, when the user device transmits using a preamble, sending a priority metric evaluated by the user device. The method could further include, further comprising receiving a threshold value, and attempting access only when the priority metric is above the threshold value. The method could further include, further comprising evaluating the threshold using the load of the AP. The method could further include, further comprising evaluating the priority metric using a downlink signal-to-noise-plus-interference-ratio observed by the user device and its previous transmissions.

The method could further include, wherein the mini-channels are multiplexed in accordance with code/preamble division, time division, or frequency division.

Although the present disclosure and its advantages have been described in detail, it should be understood that various changes, substitutions and alterations can be made herein without departing from the spirit and scope of the disclosure as defined by the appended claims.

What is claimed is:

1. A method for operating a user device adapted to transmit data in a communications system in which available resources are divided into contention resources and non-contention resources, the method comprising:
   selecting, by the user device, a first non-contention resource from the non-contention resources in accordance with selection information including at least historical non-contention resource usage information;
   determining, by the user device, a contention resource from a first plurality of contention resources associated with the first non-contention resource, in accordance with an association between the first plurality of contention resources and the first non-contention resource, the association received by the user device from a network node in the communications system;
   transmitting, by the user device, a message on the contention resource, wherein the message initiates a random access procedure to obtain access to the selected first non-contention resource; and
   transmitting, by the user device, data on the first non-contention resource upon receiving an acknowledgement of the message, wherein selecting the first non-contention resource comprises:
   determining a first number of non-contention resources that the user device has used to transmit data during a prior time interval;

determining a second number of non-contention resources that the user device is eligible to use to transmit data during an upcoming time interval in accordance with the first number of non-contention resources; and selecting one of the second number of non-contention resources in accordance with the selection information as the first non-contention resource upon detecting that the second number is greater than or equal to one, and wherein the second number is greater than one and the upcoming time interval is M*a single time to transmit interval in duration, where M is an integer value greater than 2, and wherein the selecting the first non-contention resource further comprises selecting (the second number minus 1)/M of the second number of non-contention resources in accordance with the selection information as additional non-contention resources for each of M single time to transmit intervals.

2. The method of claim 1, where the acknowledgement comprises an index of the first non-contention resource.

3. The method of claim 1, where the acknowledgement is received in a downlink control channel.

4. The method of claim 1, further comprising:
receiving allocation information for a second non-contention resource; and
transmitting the data on the second non-contention resource.

5. The method of claim 1, wherein the second number is greater than one and the upcoming time interval is equal to a single time to transmit interval, and wherein the selecting the first non-contention resource further comprises selecting the second number minus one of the second number of non-contention resources in accordance with the selection information as additional non-contention resources.

6. The method of claim 5, further comprising:
determining an additional contention resource for each of the additional non-contention resources, wherein the additional contention resource is selected from a second plurality of contention resources associated with the additional non-contention resources, wherein the association between the second plurality of contention resources and the additional non-contention resources is known by the user device and the network node in the communications system; and
transmitting additional messages on the additional contention resources, wherein the additional messages each initiates a random access procedure.

7. The method of claim 1, wherein the contention resource is randomly selected from the first plurality of contention resources associated with the first non-contention resource.

8. The method of claim 1, wherein the contention resources comprise preambles and the non-contention resources comprise resource blocks (RBs).

9. The method of claim 1, further comprising receiving system information and the association between the first plurality of contention resources and the first non-contention resource from the network node.

10. The method of claim 1, further comprising:
transmitting data on the first non-contention resource using a first antenna;
selecting a third non-contention resource from the non-contention resources in accordance with the selection information, the user device configured to transmit data on the third non-contention resource using a second antenna;

determining a further contention resource from a third plurality of contention resources associated with the third non-contention resource, wherein the association between the third plurality of contention resources and the third non-contention resource is known by the user device and the network node in the communications system; and
transmitting an additional message on the further contention resource, wherein the additional message initiates a random access procedure to obtain access to the selected third non-contention resource.

11. A user device adapted to transmit data in a communications system in which available resources are divided into contention resources and non-contention resources, the user device comprising:
a processor; and
a computer readable storage medium storing programming for execution by the processor, the programming including instructions to:
select a first non-contention resource from the non-contention resources in accordance with selection information including at least historical non-contention resource usage information,
determine a contention resource from a first plurality of contention resources associated with the first non-contention resource, wherein the association between the first plurality of contention resources and the first non-contention resource is known by the user device and a network node in the communications system,
transmit a message on the contention resource, wherein the message initiates a random access procedure to obtain access to the selected first non-contention resource, and
transmit data on the first non-contention resource upon receiving an acknowledgement of the message, wherein the programming includes instructions to determine a first number of non-contention resources that the user device has used to transmit data during a prior time interval, determine a second number of non-contention resources that the user device is eligible to use to transmit data during an upcoming time interval in accordance with the first number of non-contention resources, and select one of the second number of non-contention resources in accordance with the
selection information as the first non-contention resource upon detecting that the second number is greater than or equal to one, and wherein the second number is greater than one and the upcoming time interval is M*a single time to transmit interval in duration, where M is an integer value greater than 2, and wherein the instructions to select the first non-contention resource further comprise instructions to select (the second number minus 1)/M of the second number of non-contention resources in accordance with the selection information as additional non-contention resources for each of M single time to transmit intervals.

12. The user device of claim 11, wherein the programming includes instructions to receive allocation information for a second non-contention resource, and transmit the data on the second non-contention resource.

13. The user device of claim 11, where the acknowledgement comprises an index of the first non-contention resource.

14. The user device of claim 11, where the acknowledgement is received in a downlink control channel.

15. The user device of claim 11, wherein the second number is greater than one and the upcoming time interval is equal to a single time to transmit interval, and wherein the instructions to select the first non-contention resource further comprise instructions to select the second number minus one of the second number of non-contention resources in accordance with the selection information as additional non-contention resources.

16. The user device of claim 15, wherein the programming includes instructions to:
   determine an additional contention resource for each of the additional non-contention resources, wherein the additional contention resource is selected from a second plurality of contention resources associated with the additional non-contention resources, wherein the association between the second plurality of contention resources and the additional non-contention resources is known by the user device and the network node in the communications system; and
   transmit additional messages on the additional contention resources, wherein the additional messages each initiates a random access procedure.

17. The user device of claim 11, wherein the contention resource is randomly selected from the first plurality of contention resources associated with the first non-contention resource.

18. The user device of claim 11, wherein the contention resources comprise preambles and the non-contention resources comprise resource blocks (RBs).

19. The user device of claim 11, wherein the programming includes instructions to receive system information and the association between the first plurality of contention resources and the first non-contention resource from the network node.

20. The user device of claim 11, wherein the programming includes instructions to:
   transmit data on the first non-contention resource using a first antenna;
   select a third non-contention resource from the non-contention resources in accordance with the selection information, the user device configured to transmit data on the third non-contention resource using a second antenna;
   determine a further contention resource from a third plurality of contention resources associated with the third non-contention resource, wherein the association between the third plurality of contention resources and the third non-contention resource is known by the user device and the network node in the communications system; and
   transmit an additional message on the further contention resource, wherein the additional message initiates a random access procedure to obtain access to the selected third non-contention resource.

21. A user device adapted to transmit data in a communications system in which available resources are divided into contention resources and non-contention resources, the user device comprising:
   a processor; and
   a computer readable storage medium storing programming for execution by the processor, the programming including instructions to:
   receive association information from a network node in the communications system, the association information indicating more than one contention resource associated with each of the non-contention resources;
   select a first non-contention resource from the non-contention resources in accordance with channel conditions of the non-contention resources and a number of non-contention resources that the user device has used during a prior time interval, a length of the prior time interval being configured by the network node;
   determine a first plurality of contention resources associated with the first non-contention resource in accordance with the received association information, the association information comprising an association between the first plurality of contention resources and the first non-contention resource;
   select a contention resource from the first plurality of contention resources;
   transmit a message on the contention resource, wherein the message initiates a random access procedure to obtain access to the selected first non-contention resource; and
   transmit data on the first non-contention resource upon receiving an acknowledgement of the message, wherein the first non-contention resource is selected further in accordance with an average number of non-contention resources to be allocated to the user device during an upcoming time interval, the average number of non-contention resources to be allocated to the user device during the upcoming time interval and a length of the upcoming time interval being configured by the network node, wherein the number of non-contention resources that the user device has used during the prior time interval is X, the average number of non-contention resources to be allocated to the user device during the upcoming time interval is K, and the instructions to select the first non-contention resource includes instructions to select the first non-contention resource from 2*K−X non-contention resources upon determining that 2*K−X is larger than 0, and wherein the 2*K−X non-contention resources are determined in accordance with the channel conditions of the non-contention resources during the upcoming time interval.

* * * * *